United States Patent [19]
Banker et al.

[11] Patent Number: 5,164,174
[45] Date of Patent: Nov. 17, 1992

[54] DETOXIFICATION OF ALUMINUM SPENT POTLINER BY THERMAL TREATMENT, LIME SLURRY QUENCH AND POST-KILN TREATMENT

[75] Inventors: Donald B. Banker, Little Rock, Ark.; Dennis G. Brooks, Florence; Euel R. Cutshall, Tuscumbia, both of Ala.; Douglas D. Macauley; Dennis F. Strahan, both of Midlothian, Va.

[73] Assignee: Reynolds Metals Company, Richmond, Va.

[21] Appl. No.: 774,941

[22] Filed: Oct. 11, 1991

[51] Int. Cl.$^5$ .............................. C01B 7/20
[52] U.S. Cl. .................. 423/659; 423/111; 423/364; 423/497; 423/484; 423/DIG. 20; 106/791; 405/129; 588/252
[58] Field of Search ............ 423/658.5, 484, 497, 423/364, 130, DIG. 20, 111, 659; 106/791; 405/129, 128

[56] References Cited

U.S. PATENT DOCUMENTS

| | | | |
|---|---|---|---|
| 1,971,354 | 8/1934 | Scheidt et al. | 23/143 |
| 2,141,132 | 12/1938 | Folger | 23/143 |
| 2,420,852 | 5/1947 | Archibald | 23/141 |
| 3,106,448 | 10/1963 | Whicher et al. | 23/88 |
| 3,211,524 | 10/1965 | Hyde et al. | 23/141 |
| 3,476,511 | 11/1969 | Sullivan | 23/110 |
| 4,006,066 | 2/1977 | Sparwald | 204/67 |
| 4,018,867 | 4/1977 | Lee | 423/115 |
| 4,113,831 | 9/1978 | Orth, Jr. et al. | 423/119 |
| 4,113,832 | 9/1978 | Bell et al. | 423/119 |
| 4,160,808 | 7/1979 | Andersen et al. | 423/119 |
| 4,160,809 | 7/1979 | Anderson et al. | 423/119 |
| 4,226,632 | 10/1980 | Kapolyi et al. | 106/100 |
| 4,294,816 | 10/1981 | Kruger et al. | 423/484 |
| 4,436,550 | 3/1984 | Kapolyi | 75/10 R |
| 4,444,740 | 4/1984 | Snodgrass et al. | 423/483 |
| 4,512,809 | 4/1985 | Nielsen et al. | 106/103 |
| 4,523,949 | 6/1985 | Gower et al. | 75/24 |
| 4,574,073 | 3/1986 | Meyer | 423/111 |
| 4,576,651 | 3/1986 | Deutschman | 134/25.1 |
| 4,640,681 | 2/1987 | Steinbliss et al. | 432/14 |
| 4,735,784 | 4/1988 | Davis et al. | 423/111 |
| 4,784,733 | 11/1988 | Cutshall et al. | 204/67 |
| 4,927,459 | 5/1990 | Gardner et al. | 75/685 |
| 4,956,158 | 9/1990 | Nguyen et al. | 423/111 |
| 4,973,464 | 11/1990 | Rickman | 423/461 |
| 4,993,323 | 2/1991 | Tabery et al. | 110/346 |
| 5,013,356 | 5/1991 | Olper et al. | 75/586 |
| 5,024,822 | 6/1991 | Hittner et al. | 423/111 |

FOREIGN PATENT DOCUMENTS

| | | |
|---|---|---|
| 3200347 | 7/1983 | Fed. Rep. of Germany . |
| 988771 | 1/1983 | U.S.S.R. ............ 423/113 |

OTHER PUBLICATIONS

Combustion Testing Massena Black Mud Wastes, Hazen Research, Inc., Mar. 7, 1986.
Alcoa Uses Plant Near Benton to Burn New York Wastes, Arkansas Democrat. Oct. 3, 1986.
Alcoa Experiment Could Revitalize Benton Plant, Arkansas Gazette, Oct. 8, 1986.
Phase 2 Development Program for the Circulating Bed Combustion of Spent Potliners, Ogden Environmental Services, Inc., Sep. 30, 1987.

*Primary Examiner*—Gary P. Straub
*Assistant Examiner*—Timothy C. Vanoy
*Attorney, Agent, or Firm*—Alan T. McDonald

[57] ABSTRACT

A method is disclosed for detoxification of aluminum spent potliner by thermal treatment in a rotary kiln while blended with limestone and metal silicates to destroy cyanides and convert the soluble fluoride salts to relatively insoluble calcium fluoride and fluoride-bearing minerals, quenching the hot kiln discharge with an aqueous lime slurry to convert residual soluble fluoride salts on the particle surfaces to an insoluble form, and treating aqueous landfill runoff and capture with lime or limestone and recycling the treated water to the process. The treated material is suitable for landfilling in a non-hazardous waste landfill or marketing as a raw material. Air emissions are innocuous and there is no aqueous discharge.

13 Claims, 2 Drawing Sheets

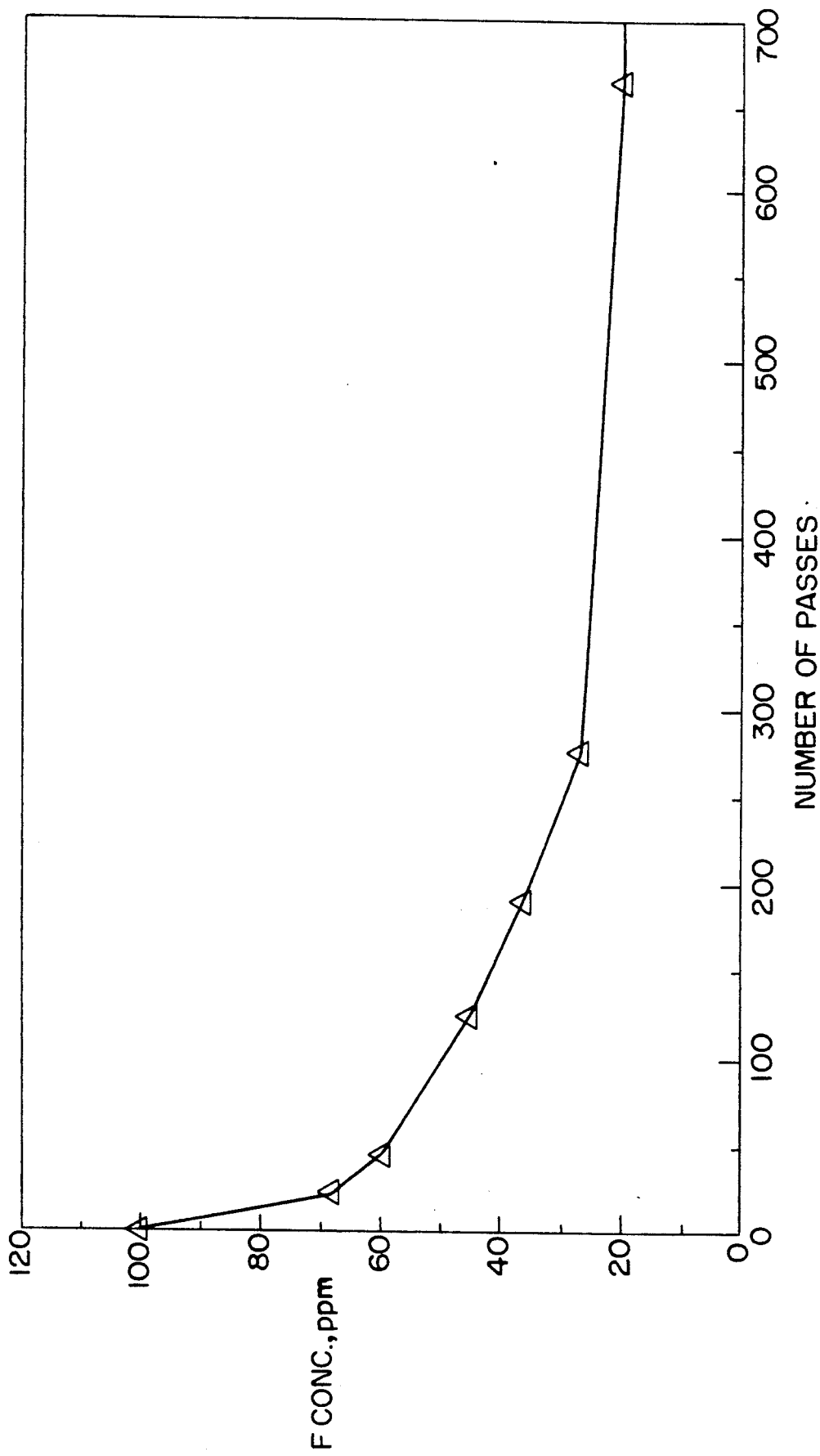

DETOXIFICATION OF ALUMINUM SPENT POTLINER BY THERMAL TREATMENT, LIME SLURRY QUENCH AND POST-KILN TREATMENT

BACKGROUND OF THE INVENTION

In the process of aluminum production, alumina is dissolved in cryolite in electrolytic cells, or pots, which are steel shells lined with carbon. A number of pots, usually more than 100, are arranged in series to form a potline. An aluminum production plant may have several potlines. The pots contain a molten electrolyte consisting primarily of cryolite ($Na_3AlF_6$) and operate at approximately 930° to 1000° C. Other materials are added to the electrolyte to improve the efficiency of the operation or to reduce power consumption, such as alumina, aluminum fluoride, sodium fluoride, soda ash, calcium fluoride, lithium carbonate and magnesium oxide.

The hearth or lining of the cell is composed of carbon, which is backed by insulation and contained within a steel container called a potshell. The carbon portion of the lining serves as the cathode and contains the molten electrolyte. The carbon lining is composed of prefabricated carbon blocks joined together by a carbon paste, which is hydraulically rammed in the seams between the carbon blocks. The sidewalls of the lining are typically formed with carbon paste, but may contain prefabricated carbon blocks. The carbon material within the lining, both blocks and paste, is predominantly anthracite-based material. It may contain some graphite to improve its electrical and thermal properties. Insulation packages for a cell are mostly of two types, a loose bed of alumina powder or refractory brick and/or castable.

Over the life of the cathode and its cell lining, the carbon and insulating materials become impregnated with fluoride-containing salts. As the ingress of salts continues, the integrity of the lining is adversely affected. Sodium, in particular, can actually intercalate within the crystalline lattice of the carbon materials, causing distortion and stresses within the lining. The insulating materials become more thermally conductive as they are impregnated by these fluoride salts. Failure can occur by cracking or excessive heaving of the lining. When these failures occur, the cell is taken off-line and the cathode lining material is removed from the potshell by mechanized digging equipment This spent cathodic material is referred to as spent potliner (SPL). The life cycle of a cathode can be from about three to about ten years. Since there are numerous pots located at a single aluminum reduction plant, the decommissioning and relining of cathodes is a continual process.

In addition to containing fluoride salts, as mentioned above, SPL contains cyanides that are formed by the ingress of air through openings in the potshell and subsequent reaction of nitrogen with the carbon lining. Therefore, cyanide is concentrated around the perimeter of the cathode, predominantly in the rammed end walls and sidewalls of the carbon lining. As the size, or capacity, of the cell is increased, the ratio of the mass around the cell periphery to the total mass of the cathode lining is reduced, and the concentration of cyanide in the spent potliner is reduced accordingly. Therefore, the concentration of cyanides in older, smaller, and more air-permeable cathodes is greater than in larger, more modern cells.

The major types of insulation used in cathodes are metallurgical alumina, having a loose, sandy appearance, and refractory bricks. Depending on the type of brick used, spent potliner may contain oxides of silicon which would not be present in cathodes insulated with alumina. The oxides do not pose an additional environmental liability regarding spent potliner and are essentially inert in the process for treating or disposing of spent potliner. The brick-insulated cathodes are also less prone to absorb fluoride salts, in which case the soluble fluoride content would be lower.

Spent potliner contains a small amount of semi-volatile organics which, in all probability, originate from the carbon paste used to fill the seams between the cathode blocks and to form the cathode sidewalls and end walls. The carbon paste forming the outermost part of the sidewalls, and thus close to the steel potshell, is not baked to sufficiently high temperatures during cell operation to carbonize all of the pitch used as a binder in the paste. A small portion of the semi-volatile organics then remain in the spent potliner. Again, the amount present can be related to the physical size of the cathode. The larger and thicker the sidewalls, the less likely that the outermost paste will be completely baked.

Spent potliner was listed by Environmental Protection Agency (EPA) on Sep. 13, 1988 (53 Fed. Reg. 35412) as a hazardous waste (K088) under 40 C.F.R., Part 261, Subpart D because it may contain significant amounts of iron cyanide complexes and free cyanide These recent actions create an immediate need in the aluminum industry for an economical process for detoxifying spent potliner such that the treated residue is not a hazardous waste. This is important because of the need for alternatives to land disposal of hazardous waste, established as national policy in the RCRA Hazardous and Solid Waste Amendments (HSWA) of 1984, and the anticipated lack of hazardous waste treatment capacity.

A review of the literature shows the composition of SPL to be highly variable. The range of analyses is given in Table I. Any process for the treatment of SPL must be versatile enough to treat SPL generated while using different cell designs, electrolyte compositions, and insulation packages, and any residues generated must meet anticipated EPA-defined limits for all constituents of concern (e.g., cyanide, fluoride, organics and metals). The components of SPL of greatest concern environmentally are cyanide and soluble fluoride salts.

TABLE I

| Spent Potliner Constituents | |
|---|---|
| Component | Range of Compositions, % |
| C | 9.6–51.0 |
| Na | 7.0–20.0 |
| Al | 4.7–22.1 |
| F | 9.7–18.9 |
| Ca | 1.1–2.9 |
| Li | 0.3–1.1 |
| Mg | 0.3–0.9 |
| Si | 0.0–12.3 |
| Fe | 0.3–2.1 |
| S | 0.1–0.3 |
| CN | 0.02–0.44 |

The aluminum industry has long recognized the environmental liability of SPL and is pursuing many options for treatment and/or disposal. These options include landfilling, recycling as a feedstock in other industries, such as the steel, cement, aluminum, or mineral wool industries, fluidized bed combustion, cryolite recovery, pyrohydrolysis, pyrosulfolysis, and others. Landfilling is an option that is presently available but will become increasingly expensive, since hazardous waste landfills are required. Recycling through other industries is an attractive and proven option, however, the classification of SPL as a hazardous waste will greatly discourage other industries from utilizing SPL, due to the cumbersome and expensive environmental regulations. Some of the other technologies may eventually have application, but many involve excessive cost and have never been proven on an industrial scale.

THE PRESENT INVENTION

The present invention provides still another process for SPL treatment and disposal, thermal treatment with lime quench and post-kiln treatment. The process of the present invention has the advantage of using a relatively simple, proven technology that is also economically competitive to landfilling. Also, as part of the process, methods are described to prevent the agglomeration of SPL during thermal treatment, and to treat captured or runoff water from the landfill.

According to the method of the present invention, a prescribed and appropriately sized blend of SPL, limestone and anti-agglomeration additive is fed to a rotary kiln and thermally treated. The thermal treatment promotes the destruction of cyanide via oxidation and the conversion of soluble fluoride salts to calcium fluoride and other insoluble fluoride-bearing minerals. The heat-treating temperature is low enough to prevent the excessive formation of volatile fluoride compounds. The anti-agglomeration additive prevents the agglomeration of the solids bed in the kiln. Agglomeration, if left unchecked, can result in reduced capacity through the rotary kiln and, if severe enough, makes the process unworkable. Effective anti-agglomeration additives are metal silicates, such as dicalcium silicate, or other metal silicate-containing minerals and clays.

The hot kiln discharge is then flash-quenched with an aqueous lime slurry to convert any residual soluble fluoride salts on the particle surfaces to relatively insoluble calcium fluoride. The lime may be quicklime (CaO) or hydrated lime ($Ca(OH)_2$). The quenching should be done while the solids are moving/agitated to prevent the discharge from partially "setting" and bridging over the entrances to the cooler.

The kiln discharge is suitable for landfill in a non-hazardous waste landfill, or for resale as a raw material in other processes, such as the production of concrete or concrete-like materials. The rain water that collects in the landfill sump or any runoff, which may contain low-level concentrations of fluoride, is pumped to limestone storage cells where the residence time is sufficient to allow for the reaction of fluoride with the surface of the limestone particles. The spent limestone is excavated, crushed to renew the reactive surface, and used as part of the feed blend. The defluorinated water is recycled to the lime slurry mixer. There is no aqueous discharge from the process.

The kiln emissions are passed through a series of fume treatment equipment including, but not limited to, an afterburner, a dry electrostatic precipitator and dry scrubber. The afterburner burns any volatile organic emissions and oxidizes carbon monoxide to carbon dioxide. The dry electrostatic precipitator removes entrained particulate matter which may be recycled to the kiln feed or landfilled. The dry scrubber removes any gaseous fluoride emissions.

BRIEF DESCRIPTION OF THE DRAWINGS

The method of the present invention will be more fully described with reference to the Figures, in which:

FIG. 2 is a graph of the results obtained in Example 3.

DETAILED DESCRIPTION OF PREFERRED EMBODIMENTS

Figure 1:
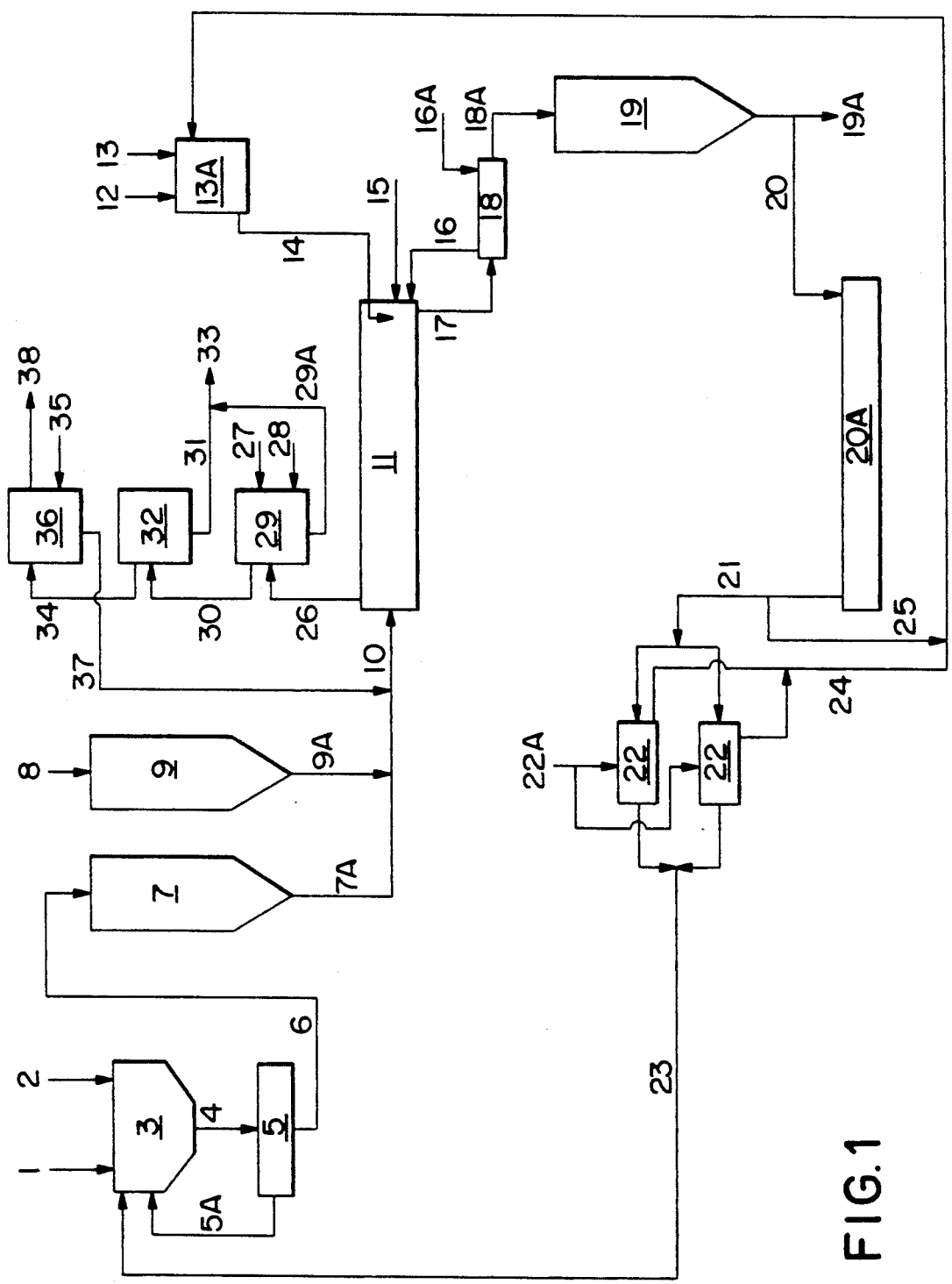
FIG. 1 is a schematic flow diagram of the process of the present invention.

Turning now to FIG. 1, spent potliner 1 and limestone 2 are fed to a crusher 3, such as an impact crusher or hammermill. The output 4 from crusher 3 is screened by screen 5, which may be, for example, a ¾ inch screen, providing a screening of the spent potliner-limestone mixture. The spent potliner 1 may be introduced at a ratio of about 0.5 to 1 to about 3 to 1 by weight to the limestone 2.

The material 5A which remains on the screen 5 is recycled back with the spent potliner 1 and limestone 2 inputs for further crushing. The material 6 passing through screen 5 is fed to storage bin 7. Alternatively, the limestone 2 may be purchased pre-sized. In this event, the spent potliner alone is passed to the crusher 3 and the output 6 from the screen 5 is then mixed with the limestone 2 in storage bin 7. The anti-agglomeration additive 8 is preferably purchased pre-sized at approximately ¼ to ¾ inch maximum particle sizing and fed to storage bin 9. Of course, the anti-agglomeration additive could be crushed and screened in the same manner as the spent potliner-limestone mixture. The output stream 7A from storage bin 7 and the output stream 9A from storage bin 9 are fed at controlled rates to become part of the total kiln feed stream 10. The anti-agglomeration additive 9A is fed at a rate such that it comprises about 10 to about 50 weight percent, preferably about 30 weight percent, of the total kiln feed stream 10.

This kiln feed stream 10 is fed to rotary kiln 11 at a rate of between about 15 and about 25 tons per hour of dry material. The rotary kiln 11 is designed to heat the mixture 10 to a final temperature of between about 1,200° and about 1,700° F., depending upon the nature of the specific spent potliner being treated and its associated temperature of agglomeration. The kiln is fired with a fuel, such natural gas 15, and combustion air 16. The rotary kiln 11 may be, for example, 250 feet long and 9 feet in diameter and rotated at about 1.25 RPM. This results in a residence time in the kiln of approximately 1 to 2 hours for the material input 10.

Interaction between the fluoride-containing spent potliner 1 and the limestone 2 is quite high within the rotary kiln 11. The limestone 2 has adequate time to react with the fluoride-containing constituents of spent potliner 1 to produce insoluble calcium fluoride and fluoride-bearing minerals, and the temperature of operation is high enough to thermally decompose the cyanide present. Little, if any, combustion of carbon occurs.

The kiln discharge 17 is quenched just prior to exiting the kiln 11 by an aqueous lime slurry spray 14. The slurry is 10 to 30 weight percent quicklime, CaO, or hydrated lime, $Ca(OH)_2$, which reacts rapidly with any residual soluble fluoride salts remaining in the kiln discharge 17. The lime slurry is applied at a rate of about 0.13 to about 0.19 pound of CaO per pound of feed, depending on the need for residual fluoride fixation. No residual moisture remains in the kiln discharge 17. The lime 12 and water 13 are fed to mixer 13A for the preparation of the slurry 14.

When treated according to the process of the present invention, total cyanide levels of the output material 17 are less than about 50 parts per million, typically in the range of from about 5 to about 30 parts per million, leachable cyanide levels are typically less than 1 part per million, and the leachable fluoride concentrations are typically about 20 to about 50 parts per million, resulting in a kiln product 17 which is environmentally acceptable for landfilling.

The preferred anti-agglomeration additive is dicalcium silicate, but can be almost any metal silicate or metal-silicate-bearing mineral or clay such as kaolin, serpentine, smectite, etc. These minerals react with or absorb the low melting point constituents in the potliner, thereby allowing the potliner to be treated at a high temperature while avoiding the agglomeration problem discussed previously.

The material output 17 from rotary kiln 11 is cooled by, for example, transport through a rotary cooler 18. The resulting cooled product 18A may be stored in, for example, storage silo 19. The treated material 20 drawn from storage silo 19 may either be taken to landfill 20A or sold as a raw material 19A. The combustion air 16 fed to kiln 11 is first preheated by drawing ambient air 16A through the shell side of cooler 18 for improved energy efficiency.

The aqueous discharge 21 from landfill 20A can be treated for fluoride removal, if necessary, by passage through a limestone storage cell 22 where the dissolved fluoride will react, over a period of several days, with the surface of the limestone particles. There should be more than one, preferably two, limestone storage cells 22 to be used interchangeably. When the limestone in one storage cell becomes spent, i.e., surface reacted, flow is diverted to a different cell which contains fresh limestone 22A. The spent limestone 23 is excavated and recycled to the crusher 3, where it is crushed to renew the surface and then used as part of the limestone requirement in the kiln feed blend.

The defluorinated water 24 discharging from the limestone storage cells 22 is pumped to mixer 13A to become part of the lime slurry 14. There is no aqueous discharge from the process. Alternatively, the aqueous discharge 21 from the landfill 20A can be routed directly to the mixer 13A as stream 25. The dissolved fluoride is reacted with the lime 12 to form insoluble calcium fluoride, which is eventually returned to the kiln 11.

The gaseous kiln emissions 26 are treated by a series of fume treatment equipment. The emissions 26 are first routed to an afterburner 29 where volatile organic constituents and airborne cyanides are destroyed by combustion. Carbon monoxide is oxidized to carbon dioxide. The ash and particulate matter that settles in the afterburner 29A is removed periodically and recycled or landfilled as part of stream 33. The afterburner is fired with a fuel 27, preferably natural gas, and combustion air 28.

The exhaust 30 from the afterburner 29 enters a dry electrostatic precipitator 32 where the entrained particulate matter is removed as stream 31, which, in turn, becomes part of stream 33. The exhaust 34 from the electrostatic precipitator 32 enters a dry scrubber 36 which is charged with a scrubbing agent 35. The scrubbing agent 35 may be either alumina, limestone, or lime. The dry scrubber removes any gaseous fluorides from the emissions prior to release to the atmosphere 38. The dry scrubber also serves as backup to the electrostatic precipitator 32 for removing particulates. The spent scrubbing agent 37 is returned to the feed system to become part of the kiln feed stream 10.

If possible, one or more of the fume treatment units can be eliminated, or the sequence of the units can be changed to improve fume treatment efficiency.

EXAMPLES

Example 1

SPL from a small-capacity reduction cell (Source 1) using alumina insulation and SPL from a large, modern reduction cell (Source 2) using refractory brick insulation were treated in a rotary kiln. The proportion of SPL, limestone and anti-agglomeration additive used was 40/30/30 by weight. The anti-agglomeration additive used was dicalcium silicate. The kiln operating parameters were as follows:

| Feed Rate | 22 tph blend |
|---|---|
| Discharge Temp. | 1200–1400° F. |
| Firing Hood Vacuum | 0.04–0.06" $H_2O$ |
| Rotational Speed | 1.25 RPM |
| Firing Rate | 3.4 MM Btu/ton SPL |
| Residence Time | Approx. 2 hr. |

Analyses of the starting SPLs are given in Table II. The cyanide and fluoride analyses of the kiln discharge and the efficiency of detoxification are given in Table III.

TABLE II

Analysis of Spent Potliner

| | Source of Spent Potliner | |
|---|---|---|
| | No. 1 | No. 2 |
| Elemental Analysis, % | | |
| C | 16.89 | 11.81 |
| Na | 19.36 | 11.33 |
| Al | 20.42 | 17.88 |
| F | 21.36 | 10.82 |
| Ca | 2.00 | 2.06 |
| Li | 0.88 | 0.46 |
| Mg | 0.93 | 0.74 |
| Fe | 0.54 | 1.81 |
| Si | 0.03 | 12.36 |
| S | 0.23 | 0.25 |
| Total CN, ppm | 1632 | 325 |
| Phases by X-Ray | NaF | NaF |
| | $NaAl_{11}O_{17}$ | $NaAl_{11}O_{17}$ |
| | $\alpha$-$Al_2O_3$ | — |
| | $Na_3AlF_6$ | $Na_3AlF_6$ |
| | C | C |
| | $CaF_2$ | $CaF_2$ |
| | $CaCO_3$ | $CaCO_3$ |
| | — | $SiO_2$ |
| | — | Muscovite |
| | — | Albite |

TABLE III

Detoxification of Spent Potliner By Thermal Treatment in a Rotary Kiln

| Spent Potliner Source | 1 | 2 |
|---|---|---|
| Spent Potliner | | |
| Total Cyanide, ppm | 1630 | 325 |
| Soluble Cyanide, mg/l | 46 | 1.7 |
| Soluble Fluoride, mg/l | 925 | 643 |
| Kiln Discharge | | |
| Total Cyanide, ppm | <10 | 0.63 |
| Soluble Cyanide, mg/l | 0.08 | <0.04 |
| Soluble Fluoride, mg/l | 21 | 9.3 |

TABLE III-continued

Detoxification of Spent Potliner By Thermal Treatment in a Rotary Kiln

| Spent Potliner Source | 1 | 2 |
|---|---|---|
| Efficiency, % | | |
| Total Cyanide Destruction | >98.5 | 99.5 |
| Soluble Cyanide Destruction | 99.6 | >94.1 |
| Soluble Fluoride Fixation | 94.3 | 96.4 |

NOTE: Solubility determined by the EP-Toxicity Extraction Procedure (Code of Federal Regulations, Title 40, Part 261, Appendix II, 1986).

The cyanide (total and soluble) and soluble fluoride contents are much less in the kiln residue than in the original SPL. A portion of this reduction is due to dilution of the SPL with other solids, limestone and anti-agglomeration additive, however, the degree of detoxification is much greater than that accounted for by dilution alone.

Soluble fluorides are converted to $CaF_2$, a stable and highly insoluble compound, by reacting the fluoride salts with limestone. Evidence that this conversion is occurring is given by the results of X-ray analysis as shown in Table IV. While these results can only be considered as semi-quantitative, it is clear that the content of NaF and $Na_3AlF_6$ is reduced and the content of $CaF_2$ is increased as the feed material passes through the kiln.

TABLE IV

X-Ray Analysis of SPL and Kiln Discharge

| | SPL Source No. 1 | | SPL Source No. 2 | |
|---|---|---|---|---|
| | SPL* | Kiln Discharge | SPL* | Kiln Discharge |
| NaF | | | | |
| 2Θ, degrees | 38.85 | 38.90 | 38.85 | 38.85 |
| Peak Area, count/s | 25151 | 5521 | 1375 | 1456 |
| $Na_3AlF_6$ | | | | |
| 2Θ, degrees | 32.59 | 32.55 | 32.55 | 32.55 |
| Peak Area, count/s | 261 | 910 | 1933 | 852 |
| $CaF_2$ | | | | |
| 2Θ, degrees | 28.24 | 28.25 | 28.30 | 28.25 |
| Peak Area, count/s | 1311 | 7096 | 1042 | 2204 |

*Peak areas have been normalized to account for the fraction of SPL in the feed blend.

Other phases detected by X-ray diffraction in the kiln discharge are cuspidine ($Ca_4F_2Si_2O_7$), calcite ($CaCO_3$), mayenite ($Ca_{12}Al_{14}O_{33}$), perovskite ($CaTiO_3$), diaoyukaoite ($NaAl_{11}O_{17}$), corundum ($Al_2O_3$) and carbon (C). Therefore, fluoride is also bound in fluoride-bearing minerals, such as cuspidine.

Example 2

A pilot kiln test was conducted to determine the effect of quenching the kiln discharge from the thermal treatment process with a lime slurry for the purpose of further reducing the soluble fluoride content. Approximately 4500 lb of a 40/30/30 blend of spent potliner, limestone and dicalcium silicate was treated. The temperature of the solids bed in the kiln ranged between 1200° F. and 1400° F. at the discharge end.

The kiln was operated for approximately 18 hours without a lime spray quench and approximately 12 hours with a lime spray quench. The lime spray was directed onto the solids bed just prior to discharge from the kiln. A slurry of hydrated lime (20% CaO equivalent) was used at a rate equivalent to 0.13 to 0.19 lb CaO per lb of feed.

Samples of discharge were collected every half hour and composites were made from the samples collected both with and without lime spray. Soluble fluoride was determined using the leachate from the Toxicity Characteristic Leaching Procedure (Code of Federal Regulations, Title 40, Part 268, Appendix I, 1990).

The average results were:
Without Lime Spray: TCLP Fluoride = 73
With Lime Spray: TCLP Fluoride = 45

This tests snows that a potentially important improvement may be realized by the use of a lime spray for quenching the kiln discharge.

Example 3

An experiment was conducted in which a fluoride solution was pumped continuously through a bed of limestone to determine the rate and extent of fluoride removal.

A fluoride solution (2 liters, 100 ppm F) was passed continuously through a bed of limestone. The limestone bed was composed of 1440 g of limestone, sized to $-\frac{3}{4}''$, +8 mesh, packed within a 1 liter glass cylinder. The fluoride solution was pumped from a reservoir beneath the cylinder to the top of the bed at a rate of 1640 ml/hr. The solution then flowed by gravity through the bed, drained into the reservoir and the cycle repeated. Samples of the solution were taken from the reservoir at various intervals and analyzed for fluoride. The experiment was continued for 14 days.

The reduction in fluoride concentration is shown in FIG. 2. Approximately 80% of the fluoride was removed from solution by reaction with limestone to form $CaF_2$. This experiment shows that the residual fluoride in runoff from the landfill should be reduced as it permeates and flows through storage cells containing limestone.

From the foregoing, it is clear that the present invention provides an effective means of detoxifying spent potliner. While the invention has been described with reference to certain specific embodiments thereof, it is not intended to be so limited thereby, except as set forth in the accompanying claims.

We claim:

1. In a method for removing cyanide and leachable fluoride from spent potliner comprising crushing said spent potliner, mixing said spent potliner with limestone to form a mixture, mixing said mixture with an anti-agglomeration additive selected from the group consisting of metal silicates and metal-silicate-bearing minerals to form a feed mixture, heating said feed mixture in a rotary kiln to a temperature to remove said cyanide and to convert most of said leachable fluoride to insoluble fluorides but lower than the fusion temperature of said feed mixture to form a treated product, the improvement comprising significantly reducing the leachable fluoride in said treated product by directly quenching said treated product with a lime slurry to produce a final product.

2. The method of claim 1 wherein said spent potliner and said limestone are mixed prior to said crushing.

3. The method of claim 1 wherein said limestone is provided at a size which does not require crushing prior to said mixing with said spent potliner and said spent potliner and said limestone are mixed after crushing of said spent potliner.

4. The method of claim 1 wherein said mixture comprises a ratio of from about 0.5 to 1 to about 3 to 1 by weight spent potliner to limestone.

5. The method of claim 1 wherein said spent potliner is crushed to −¾ inch.

6. The method of claim 1 wherein said anti-agglomeration additive is dicalcium silicate.

7. The method of claim 1 wherein said anti-agglomeration additive has a particle size of from about ¼ to about ¾ inch.

8. The method of claim 1 wherein said feed mixture comprises from about 10 to 50 percent by weight of said anti-agglomeration additive and from about 50 to about 90 percent by weight of said mixture of spent potliner and limestone.

9. The method of claim 8 wherein said feed mixture comprises about 30 percent by weight of said anti-agglomeration additive.

10. The method of claim 1 wherein said feed mixture is heated to a temperature of between 1200° and 1700° F.

11. The method of claim 10 wherein said feed mixture is heated for a period of about 1 to about 2 hours.

12. The method of claim 1 wherein said lime slurry comprises from about 10 to about 30 weight percent lime and from about 70 to about 90 percent by weight water.

13. The method of claim 12 wherein said lime in said lime slurry is provided from a member of the group consisting of quicklime and hydrated lime.

* * * * *